United States Patent
Yamada (10) Patent No.: US 8,585,523 B2
(45) Date of Patent: Nov. 19, 2013

(54) POWER TRANSMITTING MECHANISM FOR HYBRID VEHICLE

(75) Inventor: Yoshiaki Yamada, Ageo (JP)

(73) Assignee: UD Trucks Corporation, Saitama (JP)

( * ) Notice: Subject to any disclaimer, the term of this patent is extended or adjusted under 35 U.S.C. 154(b) by 0 days.

(21) Appl. No.: 13/320,979

(22) PCT Filed: Nov. 18, 2009

(86) PCT No.: PCT/JP2009/006189
§ 371 (c)(1),
(2), (4) Date: Nov. 17, 2011

(87) PCT Pub. No.: WO2010/137087
PCT Pub. Date: Dec. 2, 2010

(65) Prior Publication Data
US 2012/0065017 A1    Mar. 15, 2012

(30) Foreign Application Priority Data

May 25, 2009    (JP) .................................. 2009-125543

(51) Int. Cl.
*F16H 3/72* (2006.01)
(52) U.S. Cl.
USPC ................ 475/5; 475/282; 475/317; 475/320
(58) Field of Classification Search
USPC ..................... 475/5, 282, 317, 320
See application file for complete search history.

(56) References Cited

U.S. PATENT DOCUMENTS

| 5,433,282 A * | 7/1995 | Moroto et al. ............. 180/65.21 |
| 5,492,189 A | 2/1996 | Kriegler et al. |
| 5,713,814 A | 2/1998 | Hara et al. |
| 6,251,037 B1 | 6/2001 | Baumgaertner et al. |
| 8,075,436 B2 * | 12/2011 | Bachmann ........................ 475/5 |
| 2004/0097316 A1 | 5/2004 | Misu |
| 2004/0168841 A1 | 9/2004 | Ohta et al. |
| 2004/0211604 A1 | 10/2004 | Heitmann et al. |
| 2005/0209760 A1 | 9/2005 | Tabata et al. |
| 2007/0123384 A1 | 5/2007 | Schon et al. |

(Continued)

FOREIGN PATENT DOCUMENTS

| JP | 5-319110 | 12/1993 |
| JP | 09-014385 | 1/1997 |

(Continued)

OTHER PUBLICATIONS

"Monthly Automotive Engineering", published by Tetsudo-Nipponsha Co., Ltd., Oct. 2006, pp. 47-49.

(Continued)

*Primary Examiner* — David D Le
*Assistant Examiner* — Derek D Knight
(74) *Attorney, Agent, or Firm* — Antonelli, Terry, Stout & Kraus, LLP.

(57) ABSTRACT

A proposition is to provide a power transmitting mechanism for a hybrid vehicle having improved energy utilization efficiency. A power transmitting mechanism for the hybrid vehicle using powers of the engine and the motor/generator in a combined manner, the mechanism includes an engine drive shaft coupled to an engine output shaft via a main clutch; a motor output shaft of a motor/generator rotatably supported separately from the engine drive shaft; a drive shaft brake releasing/fixing the engine drive shaft; a motor-brake releasing/fixing the motor output shaft; and a planetary gear mechanism.

2 Claims, 7 Drawing Sheets

(56) References Cited

U.S. PATENT DOCUMENTS

| | | | |
|---|---|---|---|
| 2010/0203995 A1* | 8/2010 | Zhang et al. | 475/5 |
| 2011/0237378 A1* | 9/2011 | Rask et al. | 475/5 |
| 2011/0275466 A1* | 11/2011 | Rask et al. | 475/5 |
| 2012/0115659 A1* | 5/2012 | Yamada et al. | 475/5 |
| 2012/0129638 A1* | 5/2012 | Kaltenbach et al. | 475/5 |
| 2012/0149514 A1* | 6/2012 | Tiwari et al. | 475/5 |
| 2012/0197472 A1* | 8/2012 | He et al. | 475/5 |
| 2012/0244979 A1* | 9/2012 | Kruger | 475/5 |
| 2012/0258830 A1* | 10/2012 | Yoon et al. | 475/5 |

FOREIGN PATENT DOCUMENTS

| | | |
|---|---|---|
| JP | 9-46820 | 2/1997 |
| JP | 2000-142139 | 5/2000 |
| JP | 2000-291457 | 10/2000 |
| JP | 2004-58921 | 2/2004 |
| JP | 2004-243839 | 9/2004 |
| JP | 2004-248382 A | 9/2004 |
| JP | 2004-249937 | 9/2004 |
| JP | 2005-500481 A | 1/2005 |
| JP | 2005-206136 A | 8/2005 |
| JP | 2007-106394 A | 4/2007 |
| WO | WO 03/016749 A1 | 2/2003 |
| WO | WO 2008/071151 A1 | 6/2008 |

OTHER PUBLICATIONS

"Isuzu Technical Report", published by Isuzu Motors ltd., No. 113, Jun. 2005, pp. 66-69.

International Search Report in International Application No. PCT/JP2009/006189 mailed Mar. 2, 2010.

International Preliminary Report on Patentability and Written Opinion; International Application No. PCT/JP2009/006189; International Filing Date: Nov. 18, 2009.

Japanese Office Action dated Nov. 6, 2012; Application No. 2009-125543.

Japanese Office Action dated Jan. 22, 2013; Application No. 2009-125543.

European Search Report and European Search Opinion for Application No. 09845154.5-1752/2436546 dated Sep. 11, 2013.

* cited by examiner

POWER TRANSMITTING MECHANISM FOR HYBRID VEHICLE

CROSS-REFERENCE TO RELATED APPLICATION

This application is a U.S. National Stage application under 35 U.S.C. §371 claiming benefit of prior filed International Application Number PCT/JP2009/006189, filed Nov. 18, 2009, in which the International Application claims a priority date of May 25, 2009 based on prior filed Japanese Patent Application Number 2009-125543, the entire contents of which are incorporated herein by reference.

TECHNICAL FIELD

The present invention relates to a power transmitting mechanism for hybrid vehicle that uses powers of an engine and a motor/generator by switching/combining them in accordance with situations.

BACKGROUND ART

As disclosed in Non-Patent Documents 1 and 2 referred to hereinafter, in order to reduce a load on an engine to improve a mileage in a commercial car such as a truck, there has been recently proposed a hybrid system that uses the help of the motor at a time of starting and at a time of traveling in which a load is applied to an engine such as at a time of traveling on an uphill road.

Figure 10:
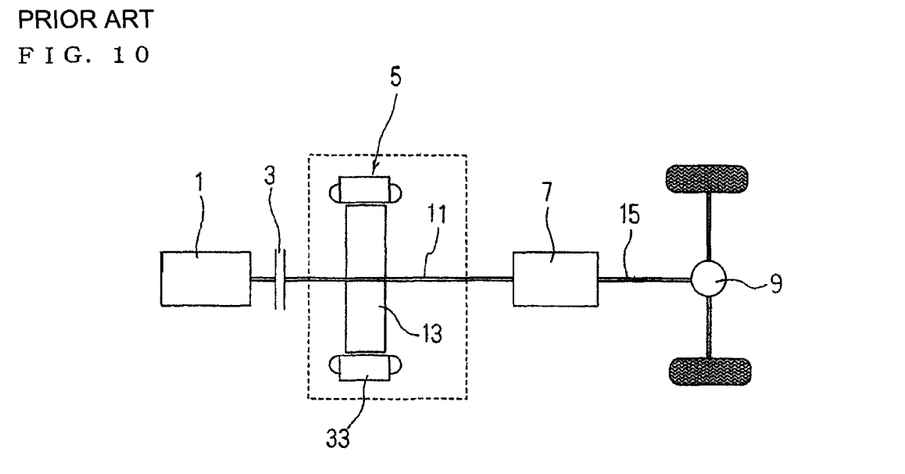
FIG. 10 is a schematic structural diagram of a conventional power transmitting mechanism.

FIG. 10 illustrates a power transmission mechanism for hybrid vehicle disclosed in Non-Patent Document 1, and as illustrated in the drawing, regarding an arrangement of driving systems of the power transmitting mechanism, an engine 1, a main clutch (single disk clutch) 3, a motor (motor/generator) 5, a transmission 7, a final reduction gear 9 are all disposed coaxially in this order. Further, a rotor 13 of the motor 5 is attached to an engine drive shaft 11 that couples between the main clutch 3 and the transmission 7, and a propeller shaft 15 is coupled between the transmission 7 and the final reduction gear 9.

Further, in the hybrid system, a vehicle starts to move using only a driving force of the motor 5 in a state of disengaging the main clutch 3, rotations of the engine 1 and the motor 5 are synchronized at a specified vehicle speed (around about 5 to 6 km/h), and after the main clutch 3 is engaged, the vehicle starts to travel with the use of only the engine 1.

Further, it is structured such that at a time of traveling in which a load is applied such as when traveling on an uphill road, high-power traveling in which the engine 1 and the motor 5 are used in a combined manner in accordance with a depressing amount of an accel pedal is started to be performed, and at a time of deceleration/braking, by disengaging the main clutch 3 in accordance with situations and making the motor 5 to be inversely operated to apply a regenerative brake equivalent to an engine brake, a braking energy (regenerative energy) is collected in a battery.

Figure 11:
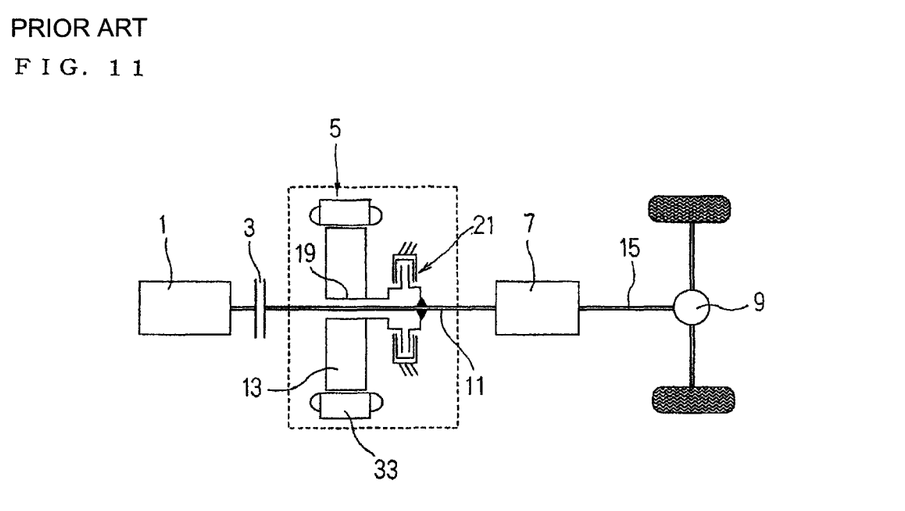
FIG. 11 is a schematic structural diagram of another conventional power transmitting mechanism.

Further, FIG. 11 illustrates a power transmitting mechanism for hybrid vehicle disclosed in Non-Patent Document 2, and in the power transmitting mechanism, a motor output shaft 19 is structured separately from an engine drive shaft 11, and a clutch mechanism 21 formed of a dog clutch is attached between the motor output shaft 19 and the engine drive shaft 11.

Figure 12:
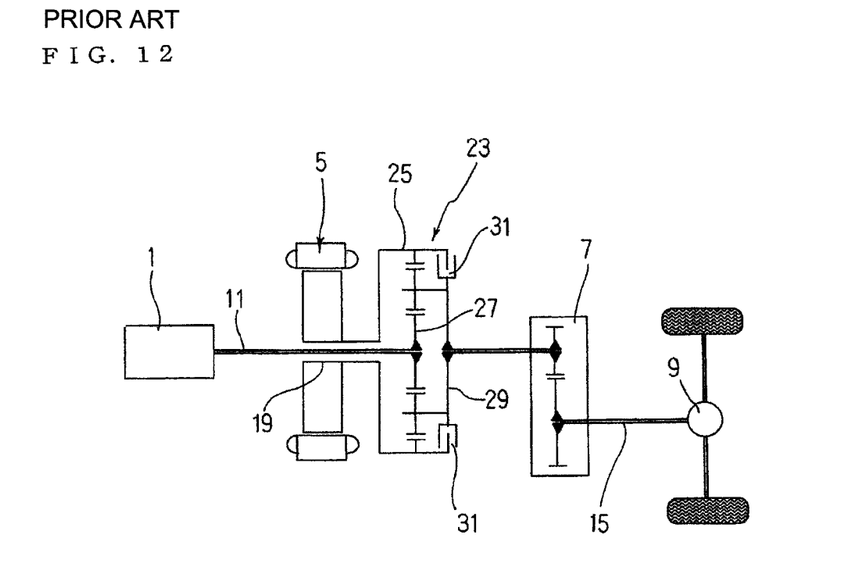
FIG. 12 is a schematic structural diagram of still another conventional power transmitting mechanism.

Furthermore, as illustrated in FIG. 12, Patent Document 1 discloses a power transmitting mechanism for hybrid vehicle in which outputs of an engine 1 and a motor 5 are synthesized in a planetary gear mechanism 23 to be output to a transmission 7 side.

As illustrated in the drawing, this power transmitting mechanism is characterized in that it is structured such that a ring gear 25 of the planetary gear mechanism 23 and a motor output shaft 19 of the motor 5 are coupled and a sun gear 27 of the planetary gear mechanism 23 and an engine drive shaft 11 are coupled to output power from a carrier 29 of the planetary gear mechanism 23 to the transmission 7 side, and meanwhile, when the ring gear 25, the carrier 29, and the sun gear 27 of the planetary gear mechanism 23 have mutually substantially the same predetermined coupling rotation speed, the carrier 29 and the ring gear 25 are integrally coupled through centrifugal clutches 31 to make a transmission ratio to be 1.

Further, with the use of this power transmitting mechanism, when the engine 1 is driven to make the sun gear 27 rotate at a coupling rotation speed of the centrifugal clutches 31 when a vehicle is stopped, a regenerative braking is applied to the motor 5 which is in a state of being inversely rotated to smoothly stop the inverse rotation and operation of the motor is smoothly changed to a normal rotation powering, the vehicle starts to move smoothly, and when a rotation speed of the motor 5 is increased while controlling the driving of the engine 1 so that the sun gear 27 keeps rotating at the coupling rotation speed, a rotation speed of the ring gear 25 soon reaches the coupling rotation speed, and the carrier 27 and the ring gear 25 are integrally coupled through the centrifugal clutches 31.

Patent Document 1: Japanese Unexamined Patent Application Publication No. H09-14385
Non-Patent Document 1: "Monthly Automotive Engineering" October 2006 issue, published by TETSUDO-NIPPONSHA CO., LTD, pages 47-49.
Non-Patent Document 2: "Isuzu Technical Journal" No. 113, 2005, published by Isuzu Motors Limited, pages 66-69

DISCLOSURE

Problems to be Solved

However, the power transmitting mechanism illustrated in FIG. 10 has a disadvantageous point that, when the traveling is performed only by the driving force of the engine 1, there occurs a loss (rotational resistance) due to idling of the motor 5, namely, a mechanical loss due to an influence of magnet attached to the rotor 13. Further, if a stator 33 of the motor 5 is electrified to eliminate such a load loss, an electrical loss is newly generated.

Further, the power transmitting mechanism illustrated in FIG. 11 can eliminate, because of its structure in which the motor output shaft 19 is structured separately from the engine drive shaft 11, a mechanical loss (rotational resistance) caused by the motor 5 when the traveling is performed only by the driving force of the engine 1, but, in order to smoothly perform engagement/disengagement of the dog clutch that forms the clutch mechanism 21, highly accurate and complicated rotation speed synchronization control becomes necessary.

Furthermore, the power transmitting mechanism using the dog clutch is assumed to be mounted on a small truck with a load capacity of 2 to 3 tons, and for the application to a large truck that requires a large motor output, insufficient strength and insufficient durability of the dog clutch have been a concern.

Further, even in the power transmitting mechanism illustrated in FIG. 12, there has been a problem that a mechanical loss (rotational resistance) caused by the motor 5 is generated when the traveling is performed only by the engine 1, similar to the conventional example in FIG. 10.

The present invention has been devised in view of such actual circumstances, and a proposition thereof is to provide a power transmitting mechanism for hybrid vehicle in which an improvement is made on this type of power transmitting mechanism for hybrid vehicle that uses the powers of the engine and the motor/generator in a combined manner, the loss due to the rotational resistance of the motor/generator during when the traveling is performed only by the engine is eliminated, and in addition to that, energy utilization efficiency is improved by enabling input/output powers of the motor and the engine to be smoothly combined or separated.

Means for Solving the Problems

In order to achieve such a proposition, according to a first aspect of the embodiment is a power transmitting mechanism for a hybrid vehicle having an engine, a main clutch, a motor/generator, a transmission, and a final reduction gear which are coaxially disposed, and using powers of the engine and the motor/generator in a combined manner, the power transmitting mechanism for the hybrid vehicle includes an engine drive shaft coupled to an engine output shaft via the main clutch; a motor output shaft of the motor/generator rotatably supported separately from the engine drive shaft; a drive shaft brake releasing/fixing the engine drive shaft; a motor-brake releasing/fixing the motor output shaft; and a planetary gear mechanism formed of a ring gear coupled to the motor output shaft, a sun gear coupled to the engine drive shaft, a plurality of planetary gears with which the sun gear and the ring gear are engaged, and a planetary carrier coupled to the transmission and receiving and transmitting orbital motions of the planetary gears, in which, by fixing the main clutch and releasing the drive shaft brake and the motor-brake, driving forces of the engine and the motor/generator are synthesized in the planetary gear mechanism to be transmitted to the transmission; by fixing the main clutch and the motor-brake and releasing the drive shaft brake, only the driving force of the engine is transmitted to the transmission from the planetary gear mechanism; by releasing the main clutch and the motor-brake and fixing the drive shaft brake, only the driving force of the motor/generator is transmitted to the transmission from the planetary gear mechanism, and the motor/generator is inversely operated when braking a vehicle to apply a regenerative brake; and by putting the engine in an idle state to fix the main clutch and inversely rotating the motor/generator to set an output from the planetary gears to "0", the vehicle stops, and by changing the rotation of the motor/generator to a forward rotation side, the vehicle starts to move.

Further, according to a second aspect of the embodiment is a power transmitting mechanism for a hybrid vehicle having an engine, a main clutch, a motor/generator, a transmission, and a final reduction gear which are coaxially disposed, and using powers of the engine and the motor/generator in a combined manner, the power transmitting mechanism for the hybrid vehicle includes an engine drive shaft coupled to an engine output shaft via the main clutch; a motor output shaft of the motor/generator rotatably supported separately from the engine drive shaft; a motor-brake releasing/fixing the motor output shaft; a planetary gear mechanism formed of a ring gear coupled to the motor output shaft, a sun gear coupled to the engine drive shaft, a plurality of planetary gears with which the sun gear and the ring gear are engaged, and a planetary carrier coupled to the transmission and receiving and transmitting orbital motions of the planetary gears; and a lock-up clutch releasing/fixing the planetary carrier and the ring gear, in which, by fixing the main clutch and releasing the motor-brake and the lock-up clutch, driving forces of the engine and the motor/generator are synthesized in the planetary gear mechanism to be transmitted to the transmission; by fixing the main clutch and the motor-brake and releasing the lock-up clutch, only the driving force of the engine is transmitted to the transmission from the planetary gear mechanism; by releasing the main clutch and the motor-brake and fixing the lock-up clutch, only the driving force of the motor/generator is transmitted to the transmission from the planetary gear mechanism, and the motor/generator is inversely operated when braking a vehicle to apply a regenerative brake; and by putting the engine in an idle state to fix the main clutch and inversely rotating the motor/generator to set an output from the planetary gears to "0", the vehicle stops, and by changing the rotation of the motor/generator to a forward rotation side, the vehicle starts to move.

Effect

According to the aspects of the embodiment, it becomes possible to achieve the starting and traveling of the vehicle in an engine drive mode for performing driving and braking with the use of only the engine, in a motor/engine cooperative drive mode for performing driving and braking using the driving forces of the engine and the motor/generator in a combined manner, and in a motor drive mode for performing driving and regenerative braking with the use of only the motor/generator.

Further, according to the first and second aspects of the embodiment, there is an advantage that it is possible to perform, in the engine drive mode, traveling by conducting engagement/disengagement of the main clutch and a transmission operation of the transmission, similar to the conventional vehicle, and since the idling of the motor/generator is prevented, the engine does not have to generate an additional driving force. Further, at the time of braking, it is possible to use an enginebrake, but, by switching the mode to the motor drive mode, it is possible to use the regenerative braking provided by the motor/generator, and to efficiently collect a braking energy in a battery.

Further, in the motor drive mode, by performing traveling in combination with the transmission operation of the transmission, starting, acceleration, and regenerative braking of the vehicle can be realized, and since the engine system is not used, efficient driving and regeneration can be performed.

Further, it is possible to perform the motor drive mode in which the engine is in a stopped state or in an idling state, so that when the engine is stopped, it becomes possible to perform traveling in a noiseless vehicle interior and to perform noiseless traveling in a low-noise area.

Further, in the motor/engine cooperative drive mode, it is possible to synthesize the engine driving force and the motor driving force while synchronizing the motor driving force with the engine driving force which is being gradually transmitted by the main clutch, which reduces the needless driving power of the motor/generator.

Besides, as another driving method in the motor/engine cooperative drive mode, the main clutch is engaged to be "fixed", and the motor/generator is inversely rotated while putting the engine in an idling state, to set the output from the planetary carrier of the planetary gear mechanism to "0", which puts the vehicle in a stopped state, by making the rotation of the motor/generator change to the forward rotation side, the vehicle can start to move and accelerate, and by increasing the rotation speed of the inversely rotated motor/generator in a stopped state of the vehicle, the vehicle can be moved backward.

Further, with the use of this driving method, there are various advantages such that the necessity for the engagement/disengagement operation of the main clutch which requires a delicate operation at the time of starting is eliminated, which enables performance of an easy start.

Furthermore, according to the first and second aspects of the embodiment, since a sufficient strength of the planetary gear mechanism can be secured, it becomes possible to apply the inventions to a large truck that requires a large motor output.

Further, according to the second aspect of the embodiment, by directly coupling the planetary carrier and the ring gear with the use of the lock-up clutch at the time of regenerative braking in the motor/generator, the planetary gear transmission of the planetary gear mechanism is eliminated, which enables to perform more efficient regeneration.

DETAILED DESCRIPTION OF THE EMBODIMENTS

Hereinafter, embodiments of the present invention will be described in detail based on the drawings.

Figure 1:
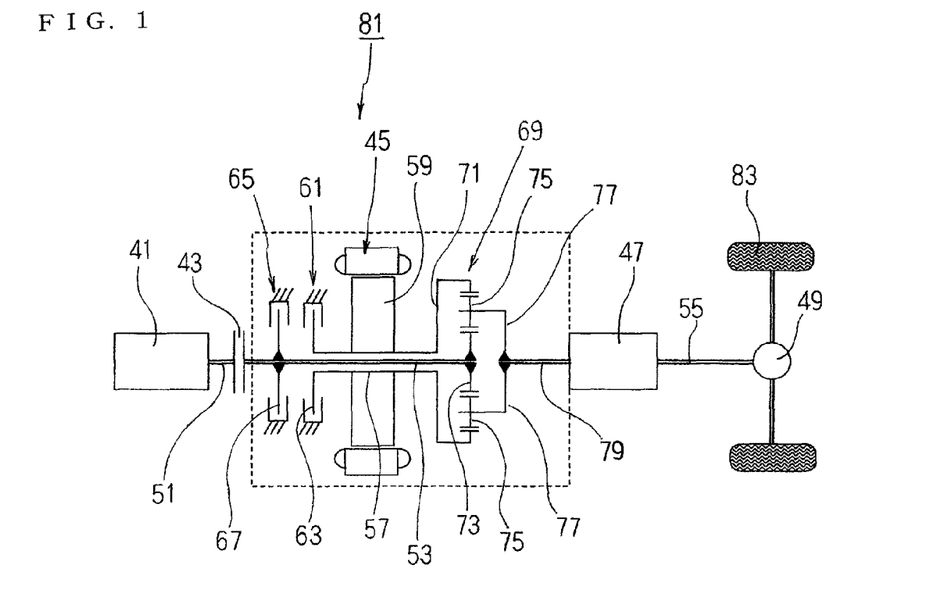
FIG. 1 is a schematic structural diagram of a power transmitting mechanism according to one embodiment of claim 1.

FIG. 1 illustrates one embodiment of a power transmitting mechanism for hybrid vehicle according a first aspect of the embodiment, in which, similar to the conventional example in FIG. 10, regarding an arrangement of driving systems of the power transmitting mechanism according to the present embodiment, an engine 41, a main clutch (single disk clutch) 43, a motor (motor/generator) 45, a transmission 47, and a final reduction gear 49 are coaxially disposed in this order, an engine drive shaft 53 is coupled to an engine output shaft 51 via the main clutch 43, and a propeller shaft 55 is coupled between the transmission 47 and the final reduction gear 49.

Further, in the drawing, 57 denotes a motor output shaft attached to a rotor 59 of the motor 45, which is structured separately from the engine drive shaft 53 and rotatably supported by a not-illustrated motor body via a bearing. Further, to one end of the motor output shaft 57 on the main clutch 43 side, a motor-brake 61 that releases/fixes the motor output shaft 57 is attached.

The motor-brake 61 is structured as a disk brake as an example, and it is designed such that when a brake disk 63 provided to the motor output shaft 57 is sandwiched between not-illustrated brake pads, a brake is applied to a rotation of the motor output shaft 57 to fix the motor output shaft 57 (fix the motor-brake 61), and further, when the brake pads are separated from the brake disk 63, the brake on the motor output shaft 57 is released (the motor-brake 61 is released).

Further, there is attached a drive shaft brake 65 which is adjacent to the motor-brake 61 and releases/fixes the engine drive shaft 53.

The drive shaft brake 65 is also structured as a disk brake as an example, and it is designed such that when a brake disk 67 provided to the engine drive shaft 53 is sandwiched between not-illustrated brake pads, a brake is applied to a rotation of the engine drive shaft 53 to fix the engine drive shaft 53 (fix the drive shaft brake 65), and further, when the brake pads are separated from the brake disk 67, the brake on the engine drive shaft 53 is released (the drive shaft brake 65 is released).

Further, there is provided, between the motor 45 and the transmission 47, a planetary gear mechanism 69 that synthesizes driving forces of the engine 41 and the motor 45.

As illustrated in the drawing, the planetary gear mechanism 69 is formed of a ring gear 71 coupled to the motor output shaft 57, a sun gear 73 coupled to the engine drive shaft 53, a plurality of planetary gears 75 with which the sun gear 73 and the ring gear 71 are engaged, and a planetary carrier 77 receiving and transmitting an orbital motion of each of the planetary gears 75, in which the planetary carrier 77 is coupled to the transmission 47 via a transmission shaft 79.

A power transmitting mechanism 81 according to the present embodiment is structured as above, and next, an operation thereof will be described based on FIG. 2 to FIG. 7.

Figure 2:
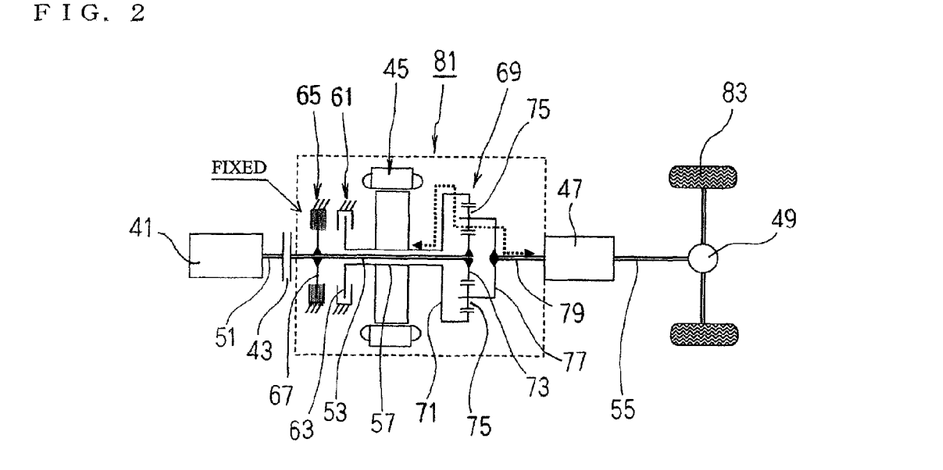
FIG. 2 is an explanatory diagram of a power transmitting path in a motor drive mode.

First, when, for example, in an idling state or a stopped state of the engine 41, the main clutch 43 is disengaged to be "released", the brake disk 67 is sandwiched by the brake pads to "fix" the drive shaft brake 65 (engine drive shaft 53), and the brake pads are separated from the brake disk 63 to "release" the motor-brake 61 (motor output shaft 57) to rotate the motor 45 in a forward direction, as illustrated in FIG. 2, the rotation of the sun gear 73 coupled to the engine drive shaft 53 is regulated, so that each of the planetary gears 75 rotates around the sun gear 73 while rotating on its own axis, resulting in that the driving force of the motor 45 is transmitted to the transmission 47 from the transmission shaft 79, and a vehicle starts to move using only a driving force of the motor 45 (motor drive mode).

Figure 3:
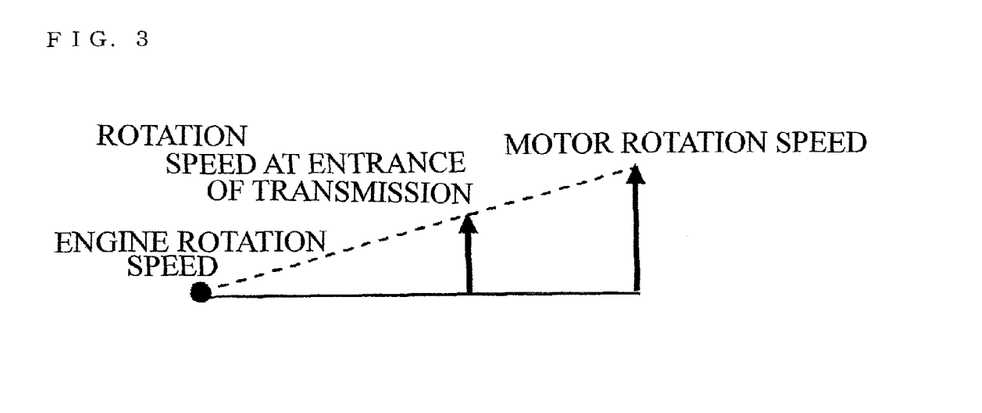
FIG. 3 is a collinear diagram regarding the motor drive mode.

Therefore, by performing driving in combination with a transmission operation of the transmission 47, the starting and acceleration of the vehicle can be achieved as illustrated in FIG. 3, and since the engine system is not used, the motor 45 is efficiently driven.

Further, at the time of braking the vehicle, a torque from a tire 83 is input into the motor 45 via the planetary gear mechanism 69 to make the motor 45 inversely operate, so that a regenerative brake equivalent to an engine brake is applied, and a braking energy is collected in a battery.

Figure 4:
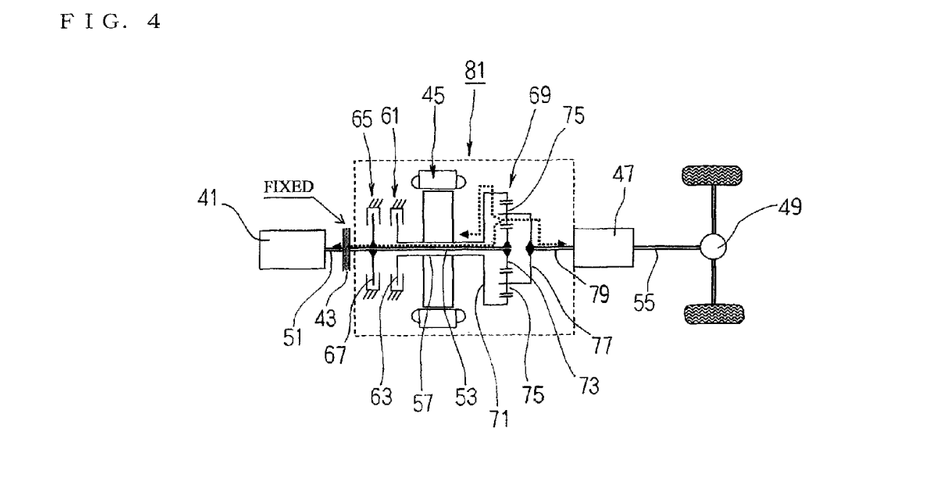
FIG. 4 is an explanatory diagram of a power transmitting path in a motor/engine cooperative drive mode.
Figure 5:
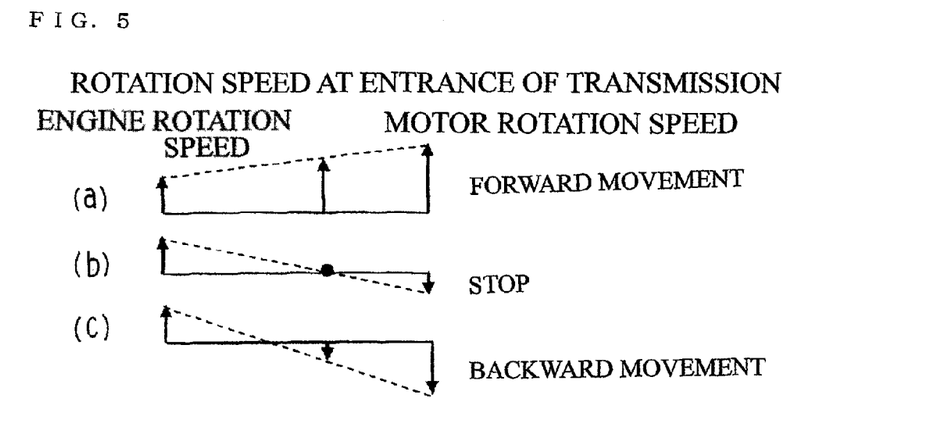
FIG. 5 are collinear diagrams regarding the motor/engine cooperative drive mode.

Further, when, after the vehicle starts to move in the motor drive mode in FIG. 2 in an idling state of the engine 41, the main clutch 43 is engaged to be "fixed", and the brake pads are separated from the brake disk 67 to "release" the drive shaft brake 65 (engine drive shaft 53), as illustrated in FIG. 4, the brake on the sun gear 73 is released, so that as illustrated in FIG. 5(a), the mode turns into the motor/engine cooperative drive mode in which the driving force of the motor 45 and the driving force of the engine 41 are synthesized in the planetary gear mechanism 69. Further, at this time, it is possible to synthesize the engine driving force and the motor driving force while synchronizing the motor driving force with the engine driving force which is being gradually transmitted by the main clutch 43, which reduces the needless driving power of the motor 45.

Further, as another driving method in the motor/engine cooperative drive mode, the main clutch 43 is engaged to be "fixed", and the motor 45 is inversely rotated while putting the engine 41 in an idling state, to set the output from the planetary carrier 77 to "0" as in FIG. 5(b), which puts the vehicle in a stopped state. Further, by making the rotation of the motor 45 change to the forward rotation side, the vehicle can start to move and accelerate as illustrated in FIG. 5(a), and by increasing the rotation speed of the inversely rotated motor 45 in a stopped state of the vehicle as in FIG. 5(b), the vehicle moves backward as illustrated in FIG. 5(c).

With the use of the driving method as above, according to the present embodiment, it becomes possible to perform an easy start in which the necessity for the engagement/disengagement operation of the main clutch 43 which requires a delicate operation at the time of starting is eliminated.

Figure 6:
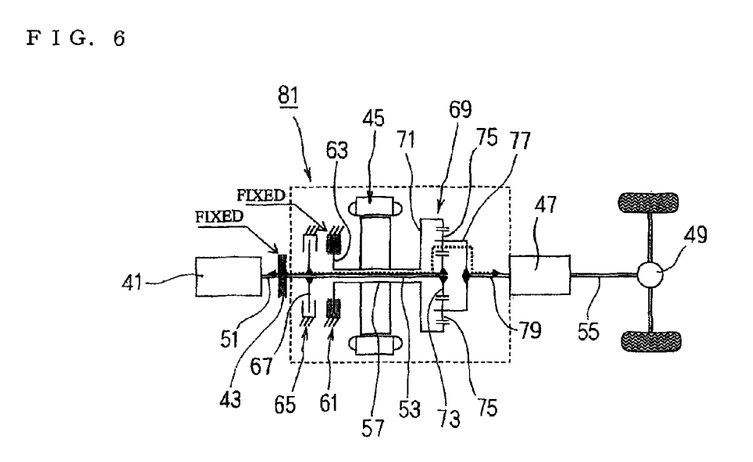
FIG. 6 is an explanatory diagram of a power transmitting path in an engine drive mode.

Next, explanation will be made on the engine drive mode utilizing only the driving force of the engine 41. When, after the motor 45 is stopped and the engine 41 is started, the main clutch 43 is engaged to be "fixed", and the brake disk 63 is sandwiched by the brake pads to "fix" the motor-brake 61 (motor output shaft 57), as illustrated in FIG. 6, the rotation of the ring gear 71 is regulated, so that each of the planetary gears 75 rotates around the sun gear 73 while rotating on its own axis with the driving force of only the engine 41, resulting in that the driving force of the engine 41 is transmitted to the transmission 47 from the transmission shaft 79, and the vehicle starts to move using only the driving force of the engine 41.

Figure 7:
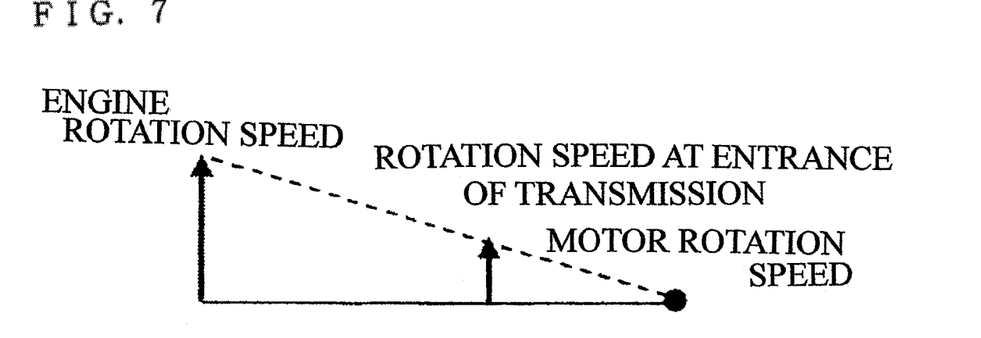
FIG. 7 is a collinear diagram regarding the engine drive mode.

Further, by performing driving in combination with the transmission 47, the starting and acceleration of the vehicle can be achieved as illustrated in FIG. 7, and since the motor system is not used, there is no mechanical loss caused by the motor 45, and it is possible to perform traveling in a similar manner to that of the conventional vehicle.

Further, in this engine drive mode, it is possible to use an engine brake at the time of braking, but, by switching the mode to the motor drive mode in FIG. 2 at the time of braking, it is possible to efficiently collect the braking energy in the battery, as described above.

Next, explanation will be made on a switching control among the above-described motor drive mode, engine drive mode, and motor/engine cooperative drive mode. For example, it is only required that a control unit (not illustrated) releases/fixes the motor-brake 61 and the drive shaft brake 65 as in FIG. 2 to FIG. 6, in accordance with situations such as whether or not the vehicle is in a traveling state in which a load is applied to the engine 41 such as when the vehicle travels on an uphill road, and as an example, the control is performed such that, a battery capacity and a depressing amount of accel pedal are detected when the vehicle starts to travel, and when the accel pedal is depressed strongly at hill start and there is a sufficient battery capacity, the control unit "releases" the motor-brake 61 and the drive shaft brake 65 to drive the motor 45 as in FIG. 4, resulting in that high-power traveling in the motor/engine cooperative drive mode in which the driving forces of the engine 41 and the motor 45 are used in a combined manner, starts to be performed.

Further, for example, when the accelerator is depressed strongly at hill start but the battery capacity for driving the motor 45 is insufficient, the control unit "fixes" the motor-brake 61 and "releases" the drive shaft brake 65 as in FIG. 6, resulting in that the vehicle travels by using only the driving force of the engine 41.

Further, when the vehicle starts to move on a smooth road and thus the accel pedal is depressed lightly, and besides, when the battery capacity is sufficient, the control unit "fixes" the drive shaft brake 65 and "releases" the motor-brake 61 as illustrated in FIG. 2, the mode turns into the motor drive mode, and the vehicle starts to move by using only the driving force of the motor 45. Further, when, at a point at which the speed is increased, the control unit drives the engine 41 and "releases" the drive shaft brake 65, and a driver engages the main clutch 43, as illustrated in FIG. 4, the mode turns into the motor/engine cooperative drive mode in FIG. 4, and when the control unit determines that the battery capacity is insufficient when braking the vehicle, it "fixes" the drive shaft brake 65 and the driver disengages the main clutch 43 as illustrated in FIG. 2 from the motor/engine cooperative drive mode in FIG. 4, resulting in that the regenerative brake equivalent to the engine brake is applied to the motor 45, and the braking energy is collected in the battery.

As described above, the present embodiment enables achievement of the starting and traveling of the vehicle in the engine drive mode in FIG. 6 and FIG. 7 for performing driving and braking with the use of only the engine 41, in the motor/engine cooperative drive mode in FIG. 4 and FIG. 5 the performance of driving and braking using the driving forces of the engine 41 and the motor 45 in a combined manner, and in the motor drive mode in FIG. 2 and FIG. 3 the performance of driving and regenerative braking with the use of only the motor 45.

Therefore, according to the present embodiment,

[1] there is an advantage that it is possible to perform, in the engine drive mode, traveling by conducting the engagement/disengagement of the main clutch 43 and the transmission operation of the transmission 47, similar to the conventional vehicle, and since the idling of the motor 45 is prevented, the engine 41 does not have to generate an additional driving force.

Further, at the time of braking, it is possible to use the enginebrake, but, as described above, by switching the mode to the motor drive mode in FIG. 2, it is possible to use the regenerative braking provided by the motor 45, and to efficiently collect the braking energy in the battery.

Further, according to the present embodiment,

[2] in the motor drive mode, the starting, acceleration, and regenerative braking of the vehicle can be realized by performing traveling in combination with the transmission operation of the transmission 47, and since the engine system is not used, the efficient driving and regeneration can be performed.

Further, it is possible to perform the motor drive mode in which the engine 41 is in a stopped state or in an idling state, so that when the engine 41 is stopped, it becomes possible to perform traveling in a noiseless vehicle interior and to perform noiseless traveling in a low-noise area.

Further, according to the present embodiment,

[3] in the motor/engine cooperative drive mode, it is possible to synthesize the engine driving force and the motor driving force while synchronizing the motor driving force with the engine driving force which is being gradually transmitted by the main clutch 43, which reduces the needless driving power of the motor 45.

Besides, as described above, as another driving method in the motor/engine cooperative drive mode, the main clutch 43 is engaged to be "fixed", and the motor 45 is inversely rotated while putting the engine 41 in an idling state, to set the output from the planetary carrier 77 to "0" as in FIG. 5(*b*), which puts the vehicle in a stopped state, by making the rotation of the motor 45 change to the forward rotation side, the vehicle can start to move and accelerate as illustrated in FIG. 5(*a*), and by increasing the rotation speed of the inversely rotated motor 45 in a stopped state of the vehicle as in FIG. 5(*b*), the vehicle can be moved backward as illustrated in FIG. 5(*c*).

Further, with the use of this driving method, according to the present embodiment, there are various advantages such that it becomes possible to perform an easy start in which the necessity for the engagement/disengagement operation of the main clutch 43 which requires a delicate operation at the time of starting is eliminated.

Furthermore, according to the present embodiment, the aforementioned operation and effect can be achieved, and in addition to that, a sufficient strength of the planetary gear mechanism 69 can be secured, so that it becomes possible to apply the present embodiment to a large truck that requires a large motor output.

Figure 8:
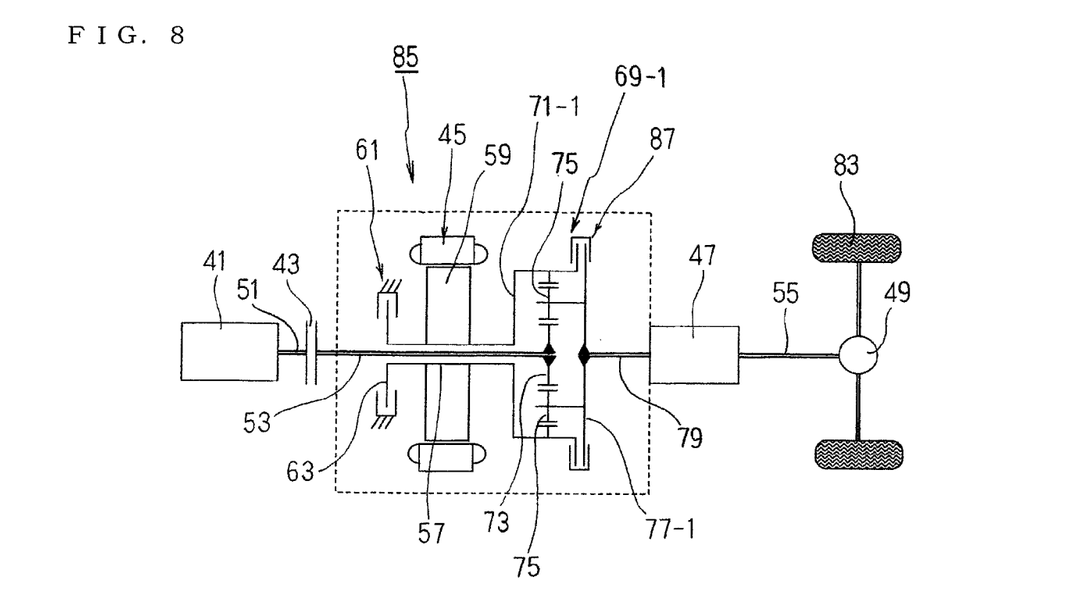
FIG. 8 is a schematic structural diagram of a power transmitting mechanism according to a second aspect of the embodiment.

FIG. 8 illustrates one embodiment of a power transmitting mechanism for hybrid vehicle according to a second aspect of the embodiment, in which a power transmitting mechanism 85 according to the present embodiment is provided with, instead of the aforementioned drive shaft brake 65, a lock-up clutch 87 that connects/disconnects a planetary carrier 77-1 of a planetary gear mechanism 69-1 coupled to the transmission 47 and a ring gear 71-1 coupled to the motor output shaft 57 (motor 45).

Figure 9:
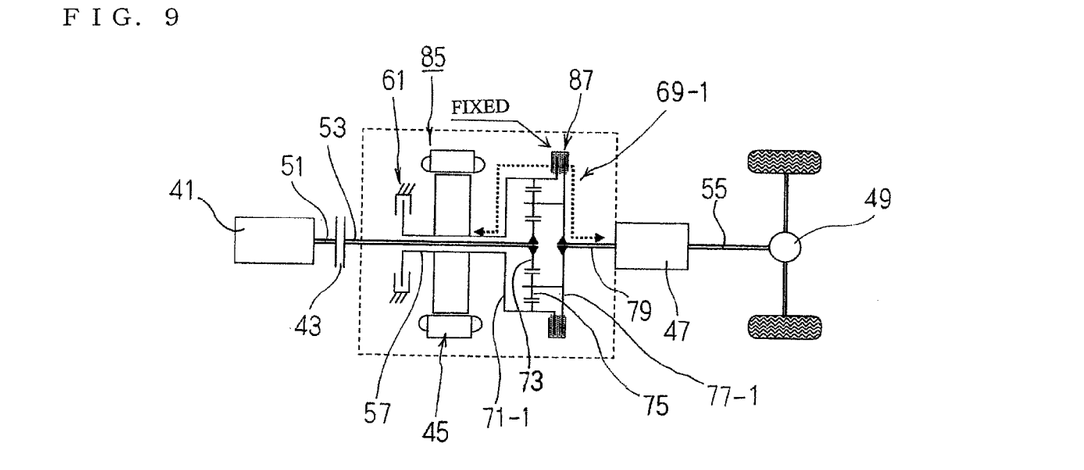
FIG. 9 is an explanatory diagram of a power transmitting path in a motor drive mode.

As has been well known conventionally, the lock-up clutch 87 is a clutch mechanism used for improving power transmitting efficiency of a torque converter in an automatic car, and as illustrated in FIG. 9, the present embodiment is characterized in that it enables performance of starting, acceleration, and regenerative braking of the vehicle in combination with the transmission operation of the transmission 47 by coupling, at the time of regenerative braking of the motor 45, the planetary carrier 77-1 and the ring gear 71-1 using the lock-up clutch 87.

Further, since the other structures of the power transmitting mechanism 85 according to the present embodiment and operations thereof are similar to those of the power transmitting mechanism 81 in FIG. 1, the same elements are denoted by the same reference numerals, and explanation of structures and explanation of operations will be omitted.

Further, the present embodiment can also achieve a desired proposition, similar to the above-described embodiment, and by directly coupling, at the time of regenerative braking in the motor 45, the planetary carrier 77-1 and the ring gear 71-1 using the lock-up clutch 87, the planetary gear transmission of the planetary gear mechanism 69-1 is eliminated, resulting in that more efficient regeneration can be performed, compared with the power transmitting mechanism 81 in FIG. 1.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. A power transmitting mechanism for a hybrid vehicle having an engine, a main clutch, a motor/generator, a transmission, and a final reduction gear which are coaxially disposed, and using powers of the engine and the motor/generator in a combined manner, the power transmitting mechanism for the hybrid vehicle comprising:

an engine drive shaft coupled to an engine output shaft via the main clutch;

a motor output shaft of the motor/generator rotatably supported separately from the engine drive shaft;

a drive shaft brake releasing/fixing the engine drive shaft;

a motor-brake releasing/fixing the motor output shaft; and a planetary gear mechanism formed of a ring gear coupled to the motor output shaft, a sun gear coupled to the engine drive shaft, a plurality of planetary gears with which the sun gear and the ring gear are engaged, and a planetary carrier coupled to the transmission and receiving and transmitting orbital motions of the planetary gears, wherein:

by fixing the main clutch and releasing the drive shaft brake and the motor-brake, driving forces of the engine and the motor/generator are synthesized in the planetary gear mechanism to be transmitted to the transmission;

by fixing the main clutch and the motor-brake and releasing the drive shaft brake, only the driving force of the engine is transmitted to the transmission from the planetary gear mechanism;

by releasing the main clutch and the motor-brake and fixing the drive shaft brake, only the driving force of the motor/generator is transmitted to the transmission from the planetary gear mechanism, and the motor/generator is inversely operated when braking a vehicle to apply a regenerative brake; and by putting the engine in an idle state to fix the main clutch and inversely rotating the motor/generator to set an output from the planetary gears to "0", the vehicle stops, and by changing the rotation of the motor/generator to a forward rotation side, the vehicle starts to move.

2. A power transmitting mechanism for a hybrid vehicle having an engine, a main clutch, a motor/generator, a transmission, and a final reduction gear which are coaxially disposed, and using powers of the engine and the motor/generator in a combined manner, the power transmitting mechanism for the hybrid vehicle comprising:

an engine drive shaft coupled to an engine output shaft via the main clutch;

a motor output shaft of the motor/generator rotatably supported separately from the engine drive shaft;

a motor-brake releasing/fixing the motor output shaft;

a planetary gear mechanism formed of a ring gear coupled to the motor output shaft, a sun gear coupled to the engine drive shaft, a plurality of planetary gears with which the sun gear and the ring gear are engaged, and a planetary carrier coupled to the transmission and receiving and transmitting orbital motions of the planetary gears; and a lock-up clutch releasing/fixing the planetary carrier and the ring gear, wherein:

by fixing the main clutch and releasing the motor-brake and the lock-up clutch, driving forces of the engine and the motor/generator are synthesized in the planetary gear mechanism to be transmitted to the transmission;

by fixing the main clutch and the motor-brake and releasing the lock-up clutch, only the driving force of the engine is transmitted to the transmission from the planetary gear mechanism;

by releasing the main clutch and the motor-brake and fixing the lock-up clutch, only the driving force of the motor/generator is transmitted to the transmission from the planetary gear mechanism, and the motor/generator is inversely operated when braking a vehicle to apply a regenerative brake; and by putting the engine in an idle state to fix the main clutch and inversely rotating the motor/generator to set an output from the planetary gears to "0", the vehicle stops, and by changing the rotation of the motor/generator to a forward rotation side, the vehicle starts to move.

\* \* \* \* \*